United States Patent
Dippl et al.

(10) Patent No.: US 8,837,323 B2
(45) Date of Patent: Sep. 16, 2014

(54) METHOD FOR TRANSMITTING A MESSAGE, NETWORK NODE AND NETWORK

(75) Inventors: Sebastian Dippl, München (DE); Steffen Rusitschka, München (DE); Alan Southall, München (DE)

(73) Assignee: Siemens Aktiengesellschaft, Munich (DE)

( * ) Notice: Subject to any disclaimer, the term of this patent is extended or adjusted under 35 U.S.C. 154(b) by 745 days.

(21) Appl. No.: 12/223,291

(22) PCT Filed: Jan. 23, 2007

(86) PCT No.: PCT/EP2007/050666
§ 371 (c)(1),
(2), (4) Date: Jul. 28, 2008

(87) PCT Pub. No.: WO2007/085601
PCT Pub. Date: Aug. 2, 2007

(65) Prior Publication Data
US 2008/0320163 A1   Dec. 25, 2008

(30) Foreign Application Priority Data
Jan. 27, 2006  (DE) .......................... 10 2006 004 025

(51) Int. Cl.
*H04L 12/28* (2006.01)
*H04L 29/08* (2006.01)

(52) U.S. Cl.
CPC ...... *H04L 29/08306* (2013.01); *H04L 67/1091* (2013.01); *H04L 67/104* (2013.01); *H04L 29/08522* (2013.01)
USPC ............ 370/254; 709/227; 709/229; 370/351

(58) Field of Classification Search
USPC .................................................. 709/227–229
See application file for complete search history.

(56) References Cited

U.S. PATENT DOCUMENTS

2002/0103998 A1   8/2002   DeBruine
2004/0109458 A1   6/2004   Narayanan et al.
(Continued)

FOREIGN PATENT DOCUMENTS

WO   2005/088466 A1   9/2005
WO   2006/008589 A1   1/2006

OTHER PUBLICATIONS

Baset et al, An Analysis of the Skype Peer-to-Peer Internet Telephone Protocol, Department of Computer Science, Columbia University, Sep. 9, 2005 (12 pps).
(Continued)

*Primary Examiner* — Jackie Zuniga Abad
(74) *Attorney, Agent, or Firm* — Staas & Halsey LLP

(57) ABSTRACT

A method allows message transmission in a peer-to-peer network using chord topology, in which some of the nodes have access protection which allows reception of messages only from those network addresses to which a message has previously been sent. A network such as this is dependent on each node maintaining a list with further nodes, referred to in general as a finger list. In order to allow communication despite access protection, each node sends a request at fixed time intervals to the nodes in its list, to send it a message. This makes it possible for each node to send messages to the nodes in its list. A search request for a file is passed on via intermediate nodes in the network such that the searching node is provided with access to a destination node which can offer the file, and the access protection of the destination node is cancelled.

20 Claims, 2 Drawing Sheets

(56) References Cited

U.S. PATENT DOCUMENTS

2004/0139228 A1* 7/2004 Takeda et al. .................. 709/245
2007/0011731 A1* 1/2007 Le et al. .......................... 726/11

OTHER PUBLICATIONS

Ziegler, Smarte Schwaerme: Die Technik Hinter modernen Peer-to-Peer-Netzen; Heft vol. 16 2005, 2-6. pp. 160-164.

Stoica et al; Chord: A Scalable Peer-to-Peer Lookup Service for Internet Applications; SIGCOMM'01, Aug. 27-021, 2001; pp. 1-12.
Ford et al. "Peer-to-Peer Communication Across Network Address Translators", 2005 USENIX Annual Technical Conference, pp. 179-192.
Ford et al, Internet Draft; Peer-to-Peer (P2P) Communication across Network Address Translators (NAT); The Internet Society (2003) (32 pps).

* cited by examiner

METHOD FOR TRANSMITTING A MESSAGE, NETWORK NODE AND NETWORK

CROSS REFERENCE TO RELATED APPLICATIONS

This application is based on and hereby claims priority to German Application No. 10 2006 004 025.2 filed on Jan. 27, 2006 and PCT Application No. PCT/EP2007/050666 filed on Jan. 23, 2007, the contents of which are hereby incorporated by reference.

BACKGROUND OF THE INVENTION

The invention relates to a method for transmitting a message and a network node and a network.

The exchange of information in modern networks, such as the Internet for example, usually works on the basis of the client-server principle. That means that a computer or a group of computers representing a server provide information. Other network nodes or computers which require this information retrieve it from the server.

This method has the disadvantage that only the server bears the load of distributing the information. The server must reply to all requests for concrete information itself and send the information to the corresponding clients which have made the request. This is particularly disadvantageous if a particular piece of information is new and is therefore retrieved by a great many clients in a short time. An example of such information is a software update, for example an update for an operating system. For such information it is necessary to provide a server capable of handling particularly high loads, which is capable of bearing the request load. Such a server is cost-intensive. If the number of requests for information declines in a short time, however, the server is no longer utilized to capacity. Investment in the high-performance server system is therefore superfluous after a short time.

Peer networks are an alternative which avoids the aforementioned disadvantages. These are networks of nodes with equality of access, i.e. computers. The peer-to-peer networks common today are an example of such a peer network. In general, peer networks are logical networks to which some nodes in a larger network, such as e.g. the Internet, are usually connected.

The most important property of peer networks is that each node can be a server and a client at the same time. This means that each node can retrieve information and also make information available. If a new piece of information such as, for example, a software update, is now to be made available, then in a peer network each node automatically offers the portion of the software update which is already stored on this node as a download for other nodes in the peer network. In general, a server which provides information such as, for example, the software update to the peer network is also necessary at least initially. However, this server no longer bears the main load of information distribution but rather the nodes in the peer network. These peer nodes are generally speaking computers belonging to network subscribers. These computers are charged with information distribution to the extent that their design permits. This means that the additional load for users of these computers generally goes unnoticed and that load distribution therefore solely depends on better use of existing resources.

In peer networks all nodes of the network operate with equal rights, in other words as peers. Each node in the network can obtain information from any other node in the network or forward information to it. In principle, this requires that all the nodes in the peer network are able to access each other. A problem may arise here if individual or even a large number of nodes in the peer network are subject to access protection. A node in the peer network may have such access protection if it is downstream of a restricted or port-restricted NAT (Network Address Translation) device. Such NAT devices have the property of only accepting incoming packets from an IP port combination or IP address to which a packet was previously sent from the receiving node. Even if the receiving node has already transmitted a packet to the sending node, receipt of a packet from the sending node is only possible for a short period, for example 30 seconds, in certain circumstances. As arbitrary access by a node in the peer network to another node in the peer network is therefore not possible, a peer network cannot be set up from nodes protected in this way without taking further measures.

A known solution for the aforementioned problem is a technology described as UDP Hole Punching. For this a hole-punching server known to all nodes is used as an aid. This provides communication between two protected nodes in the peer network. If a protected node in the peer network wants to set up a connection with a further protected node, the hole-punching server is notified of this. Hereupon the hole-punching server occasions both nodes to send each other cancellation messages in order to cancel the respective access protection by the NAT devices. In general, these cancellation messages cannot be received by the other node as a result of the access protection but nor is this necessary. As a result, however, both nodes can communicate with each other unhindered.

However, the aforementioned method has the disadvantage that a hole-punching server is required. Furthermore, this hole-punching server must be known or made known to all the nodes in the peer network. Furthermore, in a large peer network the load placed on the hole-punching server by communication requests may be very great, necessitating a correspondingly extensive and possibly cost-intensive design.

SUMMARY

One potential object is to specify an improved opportunity for communication in a network with at least partially access-protected network nodes.

The inventors propose a method for transmitting a message from a first node to a second node in a network with nodes, to which at least one additional node is assigned in each case, a sequence comprising at least one intermediate node is determined. This is performed such that a first intermediate node in the sequence is assigned to the first node, the second node is assigned to a final intermediate node in the sequence and the other intermediate nodes in the sequence are each assigned a subsequent intermediate node in the sequence. At least one of the intermediate nodes transmits a cancellation request message which triggers the transmission of a message to the first node by the node assigned to the intermediate node, to an intermediate node assigned to it.

By the proposed method according to the invention, a series of advantages are obtained. Direct communication between the nodes of the network is thus possible, even if some of these nodes are access-protected. Communication in the network operates even if all the nodes have access protection. Furthermore, it is advantageous that communication between the nodes is transparent with regard to access protection. This means that a node can always be treated the same, independently of whether it is access-protected or not. This in turn means that advantageously no node need know whether another node is access-protected or not.

In order to obtain communication between the nodes in spite of access protection, independently of the method used an additional load on the network in the form of additional messages between the nodes is necessary. However, this additional load is distributed advantageously between the nodes of the network in the method. It is particularly advantageous here that no special hole-punching server is necessary to enable communication between the nodes of the network. Compared to the use of a hole-punching server, the additional advantage is that the message load is reduced.

In an advantageous embodiment and development, the intermediate node in the sequence transmits the address of the node assigned to it to the first node. This approach has the advantage that the first node can transmit a message directly to the assigned node.

In a further advantageous embodiment and development, the address of the second node is transmitted to the first node by the last intermediate node in the sequence. This approach is characterized by greater efficiency as only the last intermediate node knows the address of the second node.

In a further advantageous embodiment and development, each intermediate node transmits the address of the next intermediate node to the first node when ascertaining the sequence. This has the advantage that the first node learns all the addresses of the intermediate nodes and can thus transmit the message with greater independence from individual intermediate nodes.

In a further advantageous embodiment and development, the first node transmits a search request message to each intermediate node when ascertaining the sequence. This approach has the advantage that a large part of the load is placed on the first node in the method for transmitting the message. As a result the possibility of accessing the network, for example by flooding with message transmissions, is advantageously reduced.

In another advantageous embodiment and development, at least the last node in the sequence transmits a cancellation request message to the second node.

The cancellation request message may, for example, result in the second node transmitting a message to the first node. As a result of this the first node can transmit a message directly to the second node, which can also receive this. Furthermore, the second node can advantageously also transmit a direct response to the first node, which in turn can also receive this. As a result of this, greater efficiency in transmitting the message is also obtained as transport of the address of the first node beyond the intermediate node is not necessary.

In a further advantageous embodiment and development, however, a cancellation request message is transmitted by each intermediate node. Furthermore, a search request message is transmitted to each intermediate node. This approach has the advantage that the content of the messages is reduced as fewer address transmissions are necessary. Furthermore, an advantage of this is that the first node constantly monitors the process of transmitting the message.

In another advantageous embodiment and development, for transmission of content to a destination node the following steps are followed:
  ascertainment of at least one source node on which the content is stored;
  transmission of a request message for the content of the destination node to the source node;
  transmission of the content of the source node to the destination node.

Such content may, for example, be a file. However, it is also possible that such content is a reference to a file, it being possible for the file itself, for example, to be stored on another node in turn as the reference. The request message is a message containing a request for transmission of the sought content to the destination node.

An advantage of this is that in a network in which the nodes are at least partially access-protected, a destination node can nevertheless perform a search for content, for example a file. Furthermore, the destination node can transmit a request message to the source node which contains the content and the source node can in turn transmit the content to the node. The reciprocal access protection which possibly exists for both nodes is cancelled advantageously.

In another advantageous embodiment and development, at least some of the nodes provide information about themselves to other nodes, the information containing their type of access protection. The type of access protection also includes the possibility that no access protection exists at all.

The advantage of this is that the number of messages which are required to cancel access protection can be reduced. This is because the transmission of certain messages which serve to cancel access protection can be avoided for a node which has no access protection. This has the advantage of taking the load off the network.

In another advantageous embodiment and development, at least some of the nodes store to which nodes messages were sent within a definable time interval and/or from which nodes messages were received within the definable time interval.

As a result of this, messages which only serve to cancel access protection can be advantageously eliminated as these are not necessary if access protection has already been cancelled within the time interval.

The network node is designed such that it executes the method.

The network contains nodes that execute the method.

Preferably the network operates as a peer-to-peer network. In a particularly preferred alternative the network operates as a chord network.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
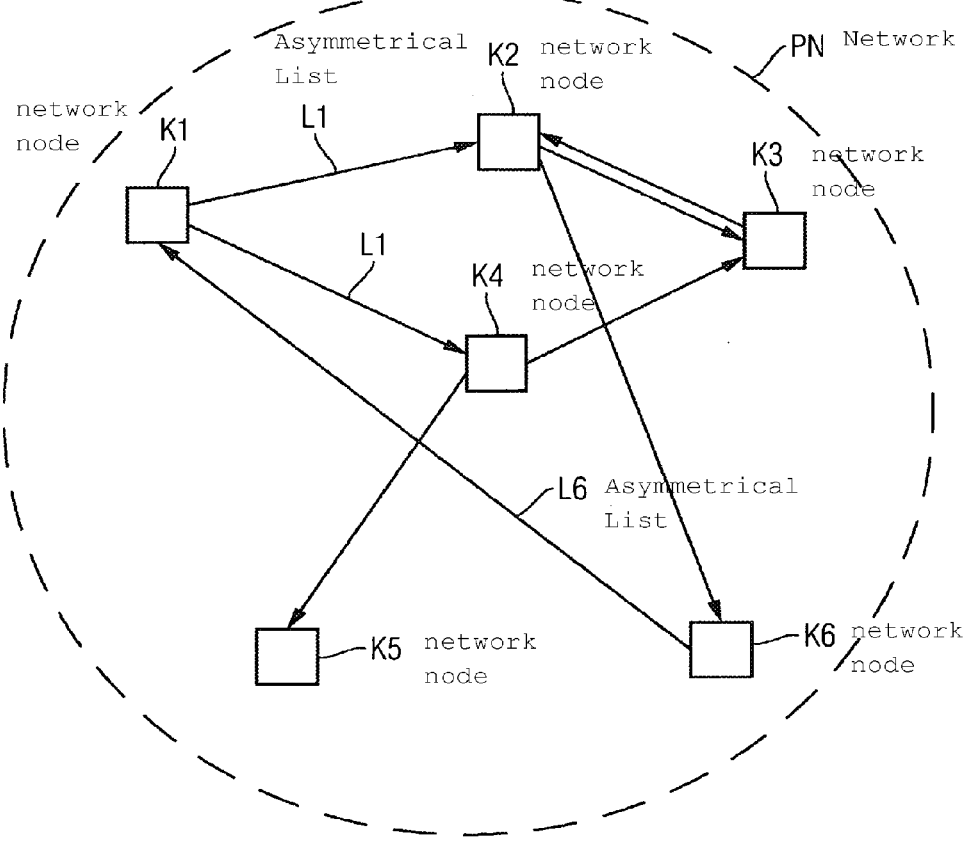
FIG. 1 shows a schematic network having six nodes.

Reference will now be made in detail to the preferred embodiments of the present invention, examples of which are illustrated in the accompanying drawings, wherein like reference numerals refer to like elements throughout.

The network PN as per FIG. 1 has six K1 network nodes KI . . . 6. In this example further nodes K1 . . . 6 are assigned to each node KI . . . 6. The assigned nodes KI . . . 6 for each node KI . . . 6 each form a so-called list, assigned at least one list. The lists are symbolized by the arrows L1 . . . 6 in FIG. 1. Each arrow L1 . . . 6 points from a node K1 . . . 6 to a node KI . . . 6 on the latter's list, i.e. assigned to it. Thus, the first K1 node has an asymmetrical list with two entries, namely the second node K2 and the fourth node K4. This is symbolized by the two arrows L1 from the first node K1 to the second or fourth node K2, K4. Furthermore, the second node K2 has an asymmetrical list with one entry, the sixth node K6. Furthermore, the second node K2 has an asymmetrical list which contains the third node K3. The third node in turn has a symmetrical list which contains the second node K2. The asymmetrical list of the fourth node K4 contains the third and fifth nodes K3, K5, while the asymmetrical list of the sixth node K6, represented by the arrow L6, contains the first node K1.

Asymmetrical lists are those lists of a first node KI . . . 6 which contain at least one node KI . . . 6, in the list of which the first node KI . . . 6 is in turn not included. On the other hand, a symmetrical list of a first node KI . . . 6 is one in which the first node KI . . . 6 is also included in each list of the nodes KI . . . 6 in its list.

In the exemplary network PN all nodes KI . . . 6 should be located behind a port-restricted NAT device which guarantees access protection. If one of the nodes KI . . . 6 of the network PN transmits a message to a further node KI . . . 6, access protection is cancelled for a period of 30 seconds in relation to the next node. This means that within this period of 30 seconds, the next node can send a message to the first node and this can also receive the message. It is not necessary here for the further node to be able to receive the first message. Instead it is also possible that its access protection prevents the receipt of this first message. Nevertheless, the access protection of the node is cancelled.

For the procedure further described it is not necessary for all nodes KI . . . 6 to have access protection. Instead the procedure also works if none or only some of the nodes KI . . . 6 have such access protection.

In order to enable communication in the network PN, the access protection of nodes KI . . . 6 which are on the list of a second node KI . . . 6 is cancelled at intervals with regard to this second node KI . . . 6. In this exemplary embodiment it is assumed that the cancellation of access protection is valid for 30 seconds. For this reason, the cancellation of access protection is repeated at intervals of 25 seconds in this example. This ensures that at any time a node KI . . . 6 can send a message to other nodes KI . . . 6 on its list and these can also receive the message. It is also possible to use a time interval other than 25 seconds, but it is expedient not to use a time interval that is too short as otherwise the loading of the network PN with messages is increased. On the other hand, the selected time interval at least for asymmetrical lists must be shorter than the interval after which access protection is set up again, in other words 30 seconds here. Furthermore, it is expedient to select the time interval for the periodic cancellation of access protection such that small delays in the transmission of the corresponding messages do not result in access protection not being cancelled again in good time and as a result not being able to be cancelled again at all.

In this example therefore the first node K1 transmits a message every 25 seconds to the second node K2 and the fourth node K4. After receipt of this message, this second node K2, K4 transmits another message to the node K1 each time. The subsequent messages ensure that access protection of nodes K2 and K4 in relation to the first node K1 is cancelled for a further 30 seconds. It is possible that the messages which are transmitted from the first node K1 to the second and fourth nodes K2, K4 contain a request to return a further message. However, alternatively it is also possible that the messages do not contain any request but the network protocol used in the network PN provides that certain messages receive answers.

Consideration is to be given below to the case in which the first node K1 wishes to transmit a first message to the sixth node K6. Furthermore, it is assumed that the first node K1 does not know the access address of the sixth node K6. The first node K1 can only establish a direct connection to those nodes K2, K4 which are on its list, i.e. to the second and fourth nodes K2, K4.

A series of intermediate nodes will now be determined for this purpose. This begins with an intermediate node assigned to the first node KI. It ends with an intermediate node assigned to the sixth node K6. To this end the first node K1 selects an intermediate node which is on its list. In this case the first node K1 selects the second node K2. It is expedient if the first node transmits a request message to the second node. By periodic cancellation of access protection regarding the nodes on its list it is possible for the second node K2 to receive the request message. In this exemplary embodiment the request message which is transmitted to the second node K2 contains a search request for the sixth node K6. The second node K2 finds the sixth node K6 on its lists. As a result of this, the second node K2 transmits the access address of the sixth node K6 to the first node K1. The first node K1 in turn can receive this message as it has previously sent the search request to the second node K2. Furthermore, the second node K2 transmits a cancellation message to the sixth node K6 to the effect that the sixth node K6 should send a random message to the first node K1. As a result of this the sixth node K6 sends a random message to the first node K1. In general the latter cannot at this moment receive the random message as the access protection of the first node K1 has not been cancelled in relation to the sixth node K6. As a result of the random message, however, the access protection of the sixth node K6 is cancelled in relation to the first node K1. As furthermore the first node K1 receives a message from the second node K2 with the access address of the sixth node K6, as a result the first node K1 can transmit the first message directly to the sixth node K6.

In this exemplary embodiment the second and the third nodes K2, K3 each have a symmetrical list. These symmetrical lists contain the other nodes K2, K3 respectively. They can be used advantageously when access protection is cancelled periodically. Therefore, on the one hand, it is not necessary to send such a message containing a request for the return of a further message to a node from a symmetrical list. This is because the other respective node in the case of symmetrical lists will likewise cancel access protection periodically. This automatic transmission takes place in this case independently of the first message. In this exemplary embodiment the second node K2 will transmit a message to the third node K3 every 25 seconds and the third node K3 will likewise transmit a message to the second node K2 every 25 seconds.

A further special advantage arising from the symmetrical lists is the opportunity to select longer time intervals for the periodic cancellation of access protection. This in turn is because both nodes in symmetrical lists will each send corresponding messages to cancel the respective access protection independently of each other. This cancellation of access protection operates—contrary to the case of asymmetrical lists—even if access protection has entered into force in both nodes with regard to the respective other nodes. This in turn means that the time interval which is selected for the periodic cancellation of access protection may be even greater than the time during which the respective access protection is kept open after transmission of a message. As a result of this in turn the network load which occurs as a result of the additional messages for the cancellation of the access protection can be reduced.

In an alternative embodiment the second and third nodes K2, K3 can therefore use random messages to cancel access protection with regard to the respective other node K2, K3. The immediate return of a further message is not necessary.

Furthermore, the time interval for the periodic cancellation of access protection can be increased to, for example, 40 seconds. As a result of this, after the 30-seconds of open access, mutual access protection for the second and third nodes K2, K3 exists for approx. 10 seconds periodically, but the network load of messages is reduced.

A further advantageous embodiment alternative results if some of the nodes K1 . . . 6 or all the nodes K1 . . . 6 provide the other nodes K1 . . . 6 of the network PN with information from which the other nodes KI . . . 6 can gather whether and which type of access protection exists for the respective node KI . . . 6.

If for example the fourth node K4 in the network PN as per FIG. 1 has no access protection, it is therefore not necessary for the access protection of the fourth node K4 to be periodically cancelled. This means that those K1 nodes which have the fourth node K4 on their list, i.e. in this case the first node K1, can omit the periodically due messages to cancel protection and that there are no corresponding response messages to these messages.

Also when transmitting an initial message to a second node, certain messages can be omitted if it is known that certain nodes KI . . . 6 have no access protection.

If, for example, the second node K2 would like to transmit a first message to the fifth node K5, a sequence of intermediate nodes would be ascertained which goes from the second node K2 via the sixth, first and fourth node K6, K1, K4 to the fifth node K5. As the fourth node K4 has no access protection it is also not necessary for the first node K1 to send a cancellation message to the fourth node K4, which would in turn request that the latter sent a random message to the second node K2 in order to cancel the access protection of the fourth node K4 in relation to the second node K2. In this manner therefore two messages which would load the network PN are in turn avoided.

Figure 2:
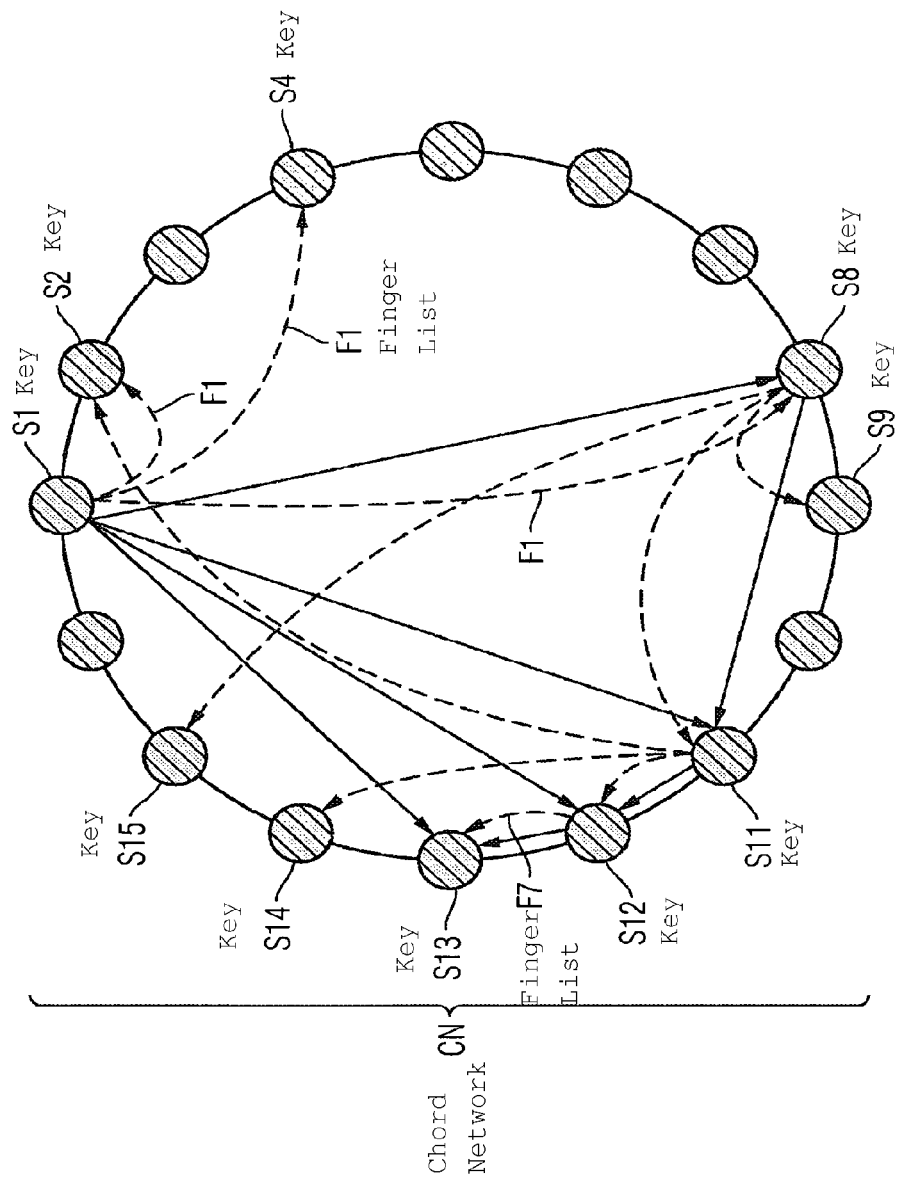
FIG. 2 shows a schematic chord network with sixteen keys.

Further advantages and details of the proposed method emerge from the chord network CN as per FIG. 2.

The chord network CN forms a ring-shaped structure, the supporting points of the ring in this case being formed by keys S1 . . . 16. A key S1 . . . 16 may represent an actual network node but this is not essential.

The files in the chord network also contain keys S1 . . . 16. The keys S1 . . . 16, which are used both for the nodes of the network CN and for the files which are stored in the network are designed such that each node and each file can be assigned a unique key. Therefore the keys used in real chord networks are considerably longer than the 4 bits used as an example here, which produce 16 different values. A further property of chord networks CN is that files are assigned to a particular node for storage on the basis of their respective key. If another network node searches for a certain key S1 . . . S16, the location of the key S1 . . . S16 can be directly ascertained from this key. Furthermore, in a large chord network CN with a plurality of computers not every node can know the access addresses of all other nodes. Therefore a list of further nodes is assigned to each node for expediency. Each node can access the nodes on its list directly, i.e. the access addresses of the nodes on the list are known to the node.

In the exemplary chord network CN as per FIG. 2 there are ten nodes which are assigned to the first, second, fourth, eighth, ninth and eleventh to fifteenth keys S1, S2, S4, S8, S9, S11 . . . 15. A list, called a finger list, with three nodes is assigned to each of these nodes. In this example the finger lists are asymmetrical but may also be symmetrical. Alternatively it is also possible that a node has asymmetrical and symmetrical lists. The respective finger lists are symbolized in FIG. 2 by the arrows F1 . . . 7, not all finger lists and not all nodes included in the finger lists being represented by arrows.

Below it will now be shown how the node which is assigned to the first key S1 can request a file which is stored on the eighth node assigned to the thirteenth key S13. It is assumed that all nodes are access-protected. The access protection corresponds to that which was also used in the first exemplary embodiment.

It is assumed that the first node can ascertain on the basis of the key of the file that the file is stored on the node assigned to the thirteenth key S13. The ring-shaped structure of the chord network CN permits the first node to ascertain the node on its finger list which is closest to the eighth node. In this case it is the fourth node which is assigned to the eighth key S8.

As in the first exemplary embodiment, in this chord network CN too access protection of nodes on the list of another node is periodically cancelled in relation to this other node. Thus the first node is in a position to transmit a message to the fourth node, which is also able to receive this. This message contains a search request for the eighth node. The fourth node can now for its part ascertain the node from its finger list which is closest to the thirteenth key S13. In this case it is the sixth node which is assigned to the eleventh key S11. As this sixth node does not appear on the finger list of the first node, the sixth node cannot receive any message directly from the first node. On the one hand, this is because the first node does not know the access address of the sixth node and on the other hand, because the access protection of the sixth node would prevent the receipt of a message from the first node.

Therefore the fourth node transmits a cancellation message to the sixth node in which the latter is requested to send a message to the first node. In this example this message is random and serves only to cancel the access protection of the sixth node in relation to the first node. In turn, the fourth node sends the first node a message in which the first node receives the access address of the sixth node. These two messages enable the first node to transmit its search request again, this time to the sixth node.

The sixth node now repeats the procedure which the fourth node has already performed. It finds the seventh node, which is assigned to the twelfth key S12, to be the node closest to the destination, i.e. the eighth node or the thirteenth key S13. As a result of this, the sixth node sends a cancellation message to the seventh node which in turn occasions the former to send a message to the first node to cancel the access protection of the seventh node in relation to the first node. Furthermore, the sixth node sends the access address of the seventh node to the first node. The first node then sends its search request to the seventh node.

The seventh node now repeats the procedure and can finally transmit the access address of the eighth node to the first node and have the access protection of the eighth node cancelled in relation to the first node by a cancellation message.

Hereupon the first node can transmit a request message to the eighth node in which the eighth node is requested to transmit the sought content to the first node. As a result of the described sequence of messages, access protection is cancelled each time in such a way that the transmission of the further messages is enabled. In particular, transmission of the search request from the first to the eighth node enables the first node to receive the response of the eighth node, i.e. the sought content, as the access protection of the first node would prevent this otherwise.

In alternative embodiments it is also possible to change the sequence or the content of certain messages as long as the necessary cancellation of access protection is not affected. For example, the search request can also be transmitted by the currently searching node to the further searching node, in other words according to the above example from the fourth to the sixth and from this to the seventh node. In this case too the access protection of the further searching node in relation to the first node and vice versa must be cancelled. This can be done, for example, by cancellation messages which the respective current searching node transmits to both the first and the further searching node. These prompt the two nodes concerned to send a random message to the other respective node.

The same advantages as in the first exemplary embodiment can also be achieved in the chord network CN if symmetrical lists are used and/or if the nodes provide the other nodes with information regarding their access protection.

In turn, messages which serve to cancel access protection can be avoided if there is no access protection. If the first node has no access protection in the exemplary transmission of the search request to the eighth node, for example, all messages which serve to cancel the access protection of the first node may be optionally omitted, for example.

A further advantageous way of avoiding messages is achieved by the nodes of the chord network CN storing the other nodes with which they have exchanged, i.e. received and/or sent, messages in the last, for example, 20 seconds. Further messages which only serve to cancel access protection can be avoided if access protection has already been cancelled.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide* v. *DIRECTV*, 69 USPQ2d 1865 (Fed. Cir. 2004).

The invention claimed is:

1. A method for transmitting message data from a first node to a second node in a same network having first, second and intermediate nodes, each node in the network being assigned to at least one other node, comprising:
    enabling access protection for at least some of the nodes in the network such that an access protected node can only receive messages from nodes to which a message was previously sent;
    determining a sequence from the first node to the second node through at least a first intermediate node and a final intermediate node, the sequence being from the first node to the first intermediate node with the first intermediate node being assigned to the first node, the sequence being from the final intermediate node to the second node with the second node being assigned to the final intermediate node;
    sending a cancellation message from at least one of the intermediate nodes to a next intermediate node in the sequence until the next intermediate node is the second node, the cancellation message originating in the at least one intermediate node;
    upon receiving the cancellation message, transmitting a random message from the second node directly to the first node, the random message being separate from the cancellation message; and
    transmitting the message data from the first node directly to the second node, without the message data passing through any other nodes, after the random message is transmitted from the second node to the first node.

2. The method as claimed in claim 1, wherein an address of the second node is transmitted to the first node.

3. The method as claimed in claim 2, wherein the address of the second node is transmitted to the first node by the final intermediate node in the sequence.

4. The method as claimed in claim 3, wherein when determining the sequence, the address of the next intermediate node is transmitted to the first node for every intermediate node after the first intermediate node.

5. The method as claimed in claim 3, wherein when determining the sequence, the first node transmits a search request message to each intermediate node.

6. The method as claimed in claim 5, wherein at least the final intermediate node transmits a cancellation message to the second node.

7. The method as claimed in claim 6, wherein
    a cancellation message is sent by each intermediate node, and
    a search request message is transmitted from the first node to each intermediate node.

8. The method as claimed in claim 7, further comprising:
    ascertaining an identity of the first node as a source node on which the message data is stored; and
    transmitting a request message for the message data from the second node to the first node.

9. The method as claimed in claim 8, wherein at least some of the nodes provide information about themselves to other nodes, the information containing their type of access protection.

10. The method as claimed in claim 9, wherein
    at least some of the nodes keep a list of the nodes to which messages were sent within a definable time interval and/or
    at least some of the nodes keep a list of the nodes from which messages were received within the definable time interval.

11. The method as claimed in claim 1, wherein the address of the second node is transmitted to the first node by the final intermediate node in the sequence.

12. The method as claimed in claim 1, wherein when determining the sequence, the address of the next intermediate node is transmitted to the first node for every intermediate node after the first intermediate node.

13. The method as claimed in claim 12, wherein when determining the sequence, the first node transmits a search request message to each intermediate node.

14. The method as claimed in claim 1, wherein at least the final intermediate node transmits a cancellation message to the second node.

15. The method as claimed in claim 14, wherein
    a cancellation message is sent by each intermediate node, and
    a search request message is transmitted from the first node to each intermediate node.

16. The method as claimed in claim 1, further comprising:
    ascertaining an identity of the first node as a source node on which the message data is stored; and
    transmitting a request message for the message data from the second node to the first node.

17. The method as claimed in claim 1, wherein at least some of the nodes provide information about themselves to other nodes, the information containing their type of access protection.

18. The method as claimed in claim 1, wherein
    at least some of the nodes keep a list of the nodes to which messages were sent within a definable time interval and/or at least some of the nodes keep a list of the nodes from which messages were received within the definable time interval.

19. A network, comprising:

a first node, a second node, and at least two intermediate nodes, each node in the network being assigned to at least one other node;

the first node, second node, and at least two intermediate nodes comprising one or more processors configured to:

enable access protection for at least some of the nodes in the network such that an access protected node can only receive messages from nodes to which a message was previously sent;

determine a sequence from the first node to the second node through at least a first intermediate node and a final intermediate node, the sequence being from the first node to the first intermediate node with the first intermediate node being assigned to the first node, the sequence being from the final intermediate node to the second node with the second node being assigned to the final intermediate node;

send a cancellation message from at least one of the intermediate nodes to a next intermediate node in the sequence until the next intermediate node is the second node, the cancellation message originating in the at least one intermediate node;

upon receiving the cancellation message, transmitting a random message from the second node directly to the first node, the random message being separate from the cancellation message; and transmitting the message data from the first node directly to the second node, without the message data passing through any other nodes, after the random message is transmitted from the second node to the first node.

20. The network as claimed in claim 19, wherein the network is a peer-to-peer chord network.

* * * * *

UNITED STATES PATENT AND TRADEMARK OFFICE
CERTIFICATE OF CORRECTION

PATENT NO. : 8,837,323 B2
APPLICATION NO. : 12/223291
DATED : September 16, 2014
INVENTOR(S) : Sebastian Dippl et al.

Page 1 of 1

It is certified that error appears in the above-identified patent and that said Letters Patent is hereby corrected as shown below:

In the Claims

Column 10, Line 8, in Claim 5, delete "claim 3," and insert -- claim 4, --, therefor.

Signed and Sealed this
Twenty-third Day of December, 2014

Michelle K. Lee
*Deputy Director of the United States Patent and Trademark Office*